United States Patent
Zhou et al.

(10) Patent No.: US 11,277,296 B2
(45) Date of Patent: *Mar. 15, 2022

(54) METHOD FOR TRANSMITTING INFORMATION IN COMMUNICATION SYSTEM, BASE STATION AND USER EQUIPMENT

(71) Applicant: SPREADTRUM COMMUNICATIONS (SHANGHAI) CO., LTD., Shanghai (CN)

(72) Inventors: Huayu Zhou, Shanghai (CN); Weijie Xu, Shanghai (CN); Zhikun Xu, Shanghai (CN)

(73) Assignee: SPREADTRUM COMMUNICATIONS (SHANGHAI) CO., LTD., Shanghai (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/725,105

(22) Filed: Dec. 23, 2019

(65) Prior Publication Data
US 2020/0136883 A1    Apr. 30, 2020

Related U.S. Application Data

(63) Continuation of application No. 15/632,750, filed on Jun. 26, 2017, now Pat. No. 10,554,468.

(30) Foreign Application Priority Data
Sep. 30, 2016   (CN) .......................... 201610877531.8

(51) Int. Cl.
*H04L 27/26*   (2006.01)
*H04L 5/00*    (2006.01)
(Continued)

(52) U.S. Cl.
CPC ........ *H04L 27/2678* (2013.01); *H04L 5/0005* (2013.01); *H04L 5/005* (2013.01);
(Continued)

(58) Field of Classification Search
CPC . H04L 27/2678; H04L 1/0013; H04L 5/0005; H04L 5/0007; H04L 5/005; H04L 27/2666; H04W 72/1289
(Continued)

(56) References Cited

U.S. PATENT DOCUMENTS 10,554,468 B2 * 2/2020 Zhou .................. H04L 27/2678
2016/0043849 A1   2/2016 Lee et al.
(Continued)

FOREIGN PATENT DOCUMENTS

| CN | 104104636 A | 10/2014 |
| CN | 105075170 A | 11/2015 |
| WO | 2016038510 A1 | 3/2016 |

OTHER PUBLICATIONS

U.S. Notice of Allowance issued to U.S. Appl. No. 15/632,750 dated Sep. 25, 2019.
(Continued)

*Primary Examiner* — Christopher R Crompton
(74) *Attorney, Agent, or Firm* — Cantor Colburn LLP (57) ABSTRACT

A method for transmitting information in a communication system, a base station and a user equipment. The method includes mapping a synchronous signal and a broadcast channel to be transmitted to preset one or more time-frequency resource blocks in a target carrier, where a numerology used by the target carrier is a first numerology group, and the first numerology group includes any one or more numerologies that are allowed to be used by the target carrier; the one or more time-frequency resource blocks are located within an initial access subband of the target carrier
(Continued)

Mapping a synchronization signal and a broadcast channel to be transmitted to preset one or more time-frequency resource blocks of a target carrier, where a numerology used by the target carrier is a first numerology group, and the first numerology group is any one or more numerologies that are allowed to be used by the target carrier; the time-frequency resource block is located within an initial access subband of the target carrier and uses a second numerology, where the second numerology is a fixed numerology; the broadcast channel carries at least configuration information of the initial access subband; and the initial access subband is a subband corresponding to a numerology in the first parameter set group. — S11

Transmitting the one or more time-frequency resource blocks to a user equipment — S12 and uses a second numerology, where the second numerology is a fixed numerology; the broadcast channel carries at least configuration information of the initial access subband; and the initial access subband is a subband corresponding to a numerology in the first numerology group; and transmitting the one or more time-frequency resource blocks to a user equipment.

22 Claims, 5 Drawing Sheets

(51) Int. Cl.
*H04W 72/12* (2009.01)
*H04L 1/00* (2006.01)

(52) U.S. Cl.
CPC ........ *H04L 5/0007* (2013.01); *H04L 27/2666* (2013.01); *H04W 72/1289* (2013.01); *H04L 1/0013* (2013.01)

(58) Field of Classification Search
USPC ....................................................... 370/329
See application file for complete search history.

(56) References Cited

U.S. PATENT DOCUMENTS

| | | | |
|---|---|---|---|
| 2016/0309466 A1* | 10/2016 | Chen | H04W 72/0446 |
| 2017/0201968 A1* | 7/2017 | Nam | H04B 7/0632 |
| 2017/0288888 A1* | 10/2017 | Rico Alvarino | H04L 12/189 |
| 2017/0353254 A1 | 12/2017 | Islam et al. | |
| 2017/0353255 A1 | 12/2017 | Islam et al. | |
| 2017/0353256 A1 | 12/2017 | Islam et al. | |
| 2017/0353257 A1 | 12/2017 | Islam et al. | |
| 2018/0049047 A1 | 2/2018 | Lin et al. | |
| 2018/0063818 A1* | 3/2018 | Chen | H04W 24/02 |
| 2018/0084593 A1* | 3/2018 | Chen | H04L 5/0048 |
| 2018/0092064 A1 | 3/2018 | Ryu et al. | |
| 2018/0262900 A1* | 9/2018 | Moon | H04L 5/005 |
| 2019/0159230 A1* | 5/2019 | Kim | H04W 72/1268 |

OTHER PUBLICATIONS

SIPO First Office Action corresponding to Application No. 201610877531.8; dated Apr. 4, 2018.
USPTO Final Office Action corresponding to U.S. Appl. No. 15/632,750 dated Feb. 13, 2019.
USPTO Non-Final Office Action corresponding to U.S. Appl. No. 15/632,750 dated Sep. 20, 2018.

* cited by examiner

METHOD FOR TRANSMITTING INFORMATION IN COMMUNICATION SYSTEM, BASE STATION AND USER EQUIPMENT

CROSS-REFERENCE TO RELATED APPLICATIONS

This application is a Continuation Application of the U.S. patent application Ser. No. 15/632,750, which claims the benefit of priority to Chinese Patent Application No. 201610877531.8, titled "METHOD FOR TRANSMITTING INFORMATION IN COMMUNICATION SYSTEM, BASE STATION AND USER EQUIPMENT", filed on Sep. 30, 2016, the entire disclosure of which are incorporated herein by reference.

TECHNICAL FIELD

The present disclosure relates to a communication technology field, and more particularly, to a method for transmitting information in a communication system, a base station and a user equipment.

BACKGROUND

In a Fifth Generation mobile communication network New Radio (5GNR) system, a carrier may be corresponding to a plurality of numerologies. Each numerology may include a Sub-Carrier Spacing (SCS) and Cyclic Prefix (CP) length. Therefore, in the 5GNR system, the carrier has a flexible configuration, which allows different application scenarios to be applied within the carrier, such as Enhanced Mobile Broad Band (EMBB) and Ultra Reliable and Low Latency Communication (URLLC), and the carrier is especially adapted for application in network slicing. However, this also brings challenge in transmission of a synchronization signal and a physical broadcast channel (referred to as a broadcast channel hereinafter).

When initially accessing a network, a user equipment (UE) needs to detect the synchronization signal and the downlink control channel, since there is no priori information on a numerology of the synchronization signal and a numerology of the downlink control channel, a blind detection is required potentially. In a Long Term Evolution (LTE) system, the UE needs to blindly detect whether a Normal Cyclic Prefix (NCP) or an Extended Cyclic Prefix (ECP) is used at the initial access. However, in the 5GNR system, there are plenty of possibilities of subcarrier spacing and CP length in the numerologies so as to support flexibility, therefore the blind detection is of high complexity.

Take the synchronization signal for example, in order to reduce the complexity of blind detection, one approach is to preset an SCS of the synchronization signal, and then send a synchronization signal with a fixed numerology on the carrier.

However, when information is transmitted to the UE as described above, the carrier applied to mapping is confined to a carrier using a same numerology as the synchronization signal with the fixed numerology. How to transmit the synchronization signal and the broadcast channel to the UE using a carrier of a non-fixed numerology has become a key problem to be solved.

SUMMARY

According to embodiments of the present disclosure, a method for transmitting information in a communication system is provided, to reduce complexity of blind detection by the user equipment by transmitting a synchronization signal and a broadcast channel to a user equipment using a carrier of a non-fixed numerology.

The method for transmitting information in a communication system includes: mapping a synchronization signal and a broadcast channel to be transmitted to preset one or more time-frequency resource blocks in a target carrier, where a numerology used by the target carrier is a first numerology group, and the first numerology group includes any one or more numerologies that are allowed to be used by the target carrier; the one or more time-frequency resource blocks are located within an initial access subband of the target carrier and uses a second numerology, where the second numerology is a fixed numerology; the broadcast channel carries at least configuration information of the initial access subband; and the initial access subband is a subband corresponding to a numerology in the first numerology group; and transmitting the one or more time-frequency resource blocks to a user equipment.

Optionally, the second numerology includes a fixed subcarrier spacing and a fixed cyclic prefix length.

Optionally, the fixed cyclic prefix length is any one of a normal cyclic prefix length and an extended cyclic prefix length.

Optionally, a time-frequency resource block has a slot duration of $½^m$ or $2^m$ milliseconds, and m is a positive integer.

Optionally, a time-frequency resource block occupies one or more slots of the initial access subband.

Optionally, the method further includes: when resource of a downlink control channel is overlapped with resource of the time-frequency resource block, adjusting the resource of the downlink control channel by rate matching to avoid the resource of the downlink control channel being overlapped with the resource of the time-frequency resource block.

Optionally, the configuration information of the initial access subband includes: a bandwidth and a numerology of the initial access subband.

Optionally, the bandwidth of the initial access subband is the same as a bandwidth of a reference signal used by the user equipment for performing a radio resource management measurement on the initial access subband.

Optionally, the bandwidth of the initial access subband is the same as a bandwidth of a downlink control channel in the initial access subband.

Optionally, a reference signal for decoding the downlink control channel in the initial access subband and a reference signal for decoding a broadcast channel in the initial access subband are of a quasi-co-location.

Optionally, a subcarrier spacing in the numerology of the initial access subband occupies 2 bits.

Optionally, a cyclic prefix length in the numerology of the initial access subband occupies 1 bit.

Optionally, the cyclic prefix length in the numerology of the initial access subband is the same as a cyclic prefix length of a time-frequency resource block.

Optionally, the configuration information of the initial access subband further includes: an offset of a center frequency point of a time-frequency resource block with respect to a center frequency point of the initial access subband.

Optionally, the method further includes at least one of: a downlink control channel in the initial access subband carrying at least scheduling information for scheduling the user equipment to receive configuration information of other subbands on a physical shared channel, where the other subbands include subbands of the target carrier other than the initial access subband; and the one or more time-frequency resource blocks including a common control channel, where the common control channel carries at least configuration information of other subbands, and the other subbands include subbands of the target carrier other than the initial access subband.

Optionally, the configuration information of the other subbands includes bandwidths and numerologies of the other subbands.

Optionally, the bandwidths of the other subbands are the same as a bandwidth of a reference signal used by the user equipment for performing radio resource management measurements on the other subbands.

Optionally, the bandwidths of the other subbands are the same as bandwidths of downlink control channels in the other subbands.

Optionally, subcarrier spacings in the numerologies of the other subbands occupy 2 bits.

Optionally, cyclic prefix lengths in the numerologies of the other subbands occupy 1 bit.

Optionally, the configuration information of the other subbands further includes: an offset of a center frequency point of a time-frequency resource block with respect to a center frequency point of each of the other subbands.

Optionally, transmitting the one or more time-frequency resource blocks to the user equipment includes: transmitting the one or more time-frequency resource blocks to the user equipment with a fixed time period.

A method for transmitting information in a communication system is also provided according to another embodiment of the present disclosure. The method includes: receiving one or more time-frequency resource blocks transmitted by a base station, where the one or more time-frequency resource blocks are located within an initial access subband and uses a second numerology, and the second numerology is a fixed numerology; the initial access subband is a subband corresponding to a numerology in a first numerology group used by a target carrier, where the first numerology group includes any one or more numerologies that are allowed to be used by the target carrier; and a time-frequency resource block includes a synchronization signal and a broadcast channel, where the broadcast channel carries at least configuration information of the initial access subband; detecting the one or more time-frequency resource blocks, obtaining the synchronization signal and performing a time-frequency synchronization; determining a location of the broadcast channel in the one or more time-frequency resource blocks and decoding the broadcast channel after a synchronization with the initial access subband; and detecting a corresponding downlink control channel based on decoded information.

Optionally, the method further includes after the synchronization with the initial access subband, obtaining configuration information of other subbands of the target carrier from the one or more time-frequency resource blocks; and accessing the other subbands according to the configuration information of the other subbands so as to transmit and receive data on the other subbands.

A base station is also provided according to an embodiment of the present disclosure. The base station includes: a mapping circuitry, configured to map a synchronization signal and a broadcast channel to be transmitted to preset one or more time-frequency resource blocks in a target carrier, where a numerology used by the target carrier is a first numerology group, the first numerology group includes any one or more numerologies that are allowed to be used by the target carrier; the one or more time-frequency resource blocks are located within an initial access subband of the target carrier and uses a second numerology, where the second numerology is a fixed numerology; the broadcast channel carries at least configuration information of the initial access subband; and the initial access subband is a subband corresponding to a numerology in the first numerology group; and a transmitting circuitry, configured to transmit the one or more time-frequency resource blocks to a user equipment.

Optionally, the second numerology includes a fixed subcarrier spacing and a fixed cyclic prefix length.

Optionally, the fixed cyclic prefix length is any one of a normal cyclic prefix length and an extended cyclic prefix length.

Optionally, a time-frequency resource block has a slot duration of $½^m$ or $2^m$ milliseconds, and m is a positive integer.

Optionally, a time-frequency resource block occupies one or more slots of the initial access subband.

Optionally, the base station further includes a resource adjusting circuitry, configured to adjust resource occupied by a downlink control channel by rate matching to avoid resource of the downlink control channel being overlapped with resource of the time-frequency resource block, when the resource of the downlink control channel is overlapped with the resource of the time-frequency resource block.

Optionally, the configuration information of the initial access subband includes a bandwidth and a numerology of the initial access subband.

Optionally, the bandwidth of the initial access subband is the same as a bandwidth of a reference signal used by the user equipment for performing a radio resource management measurement on the initial access subband.

Optionally, the bandwidth of the initial access subband is the same as a bandwidth of a downlink control channel in the initial access subband.

Optionally, a reference signal for decoding the downlink control channel in the initial access subband and a reference signal for decoding a broadcast channel in the initial access subband are of a quasi-co-location.

Optionally, a subcarrier spacing in the numerology of the initial access subband occupies 2 bits.

Optionally, a cyclic prefix length in the numerology of the initial access subband occupies 1 bit.

Optionally, the cyclic prefix length in the numerology of the initial access subband is the same as a cyclic prefix length of a time-frequency resource block.

Optionally, the configuration information of the initial access subband further includes: an offset of a center frequency point of a time-frequency resource block with respect to a center frequency point of the initial access subband.

Optionally, a downlink control channel in the initial access subband carries at least scheduling information for scheduling the user equipment to receive configuration information of other subbands on a physical shared channel, and the other subbands include subbands of the target carrier other than the initial access subband.

Optionally, the one or more time-frequency resource blocks include a common control channel, the common control channel carries at least configuration information of other subbands, and the other subbands include subbands of the target carrier other than the initial access subband.

Optionally, the configuration information of the other subbands includes bandwidths and numerologies of the other subbands.

Optionally, the bandwidths of the other subbands are the same as a bandwidth of a reference signal used by the user equipment for performing radio resource management measurements on the other subbands.

Optionally, the bandwidths of the other subbands are the same as bandwidths of downlink control channels in the other subbands.

Optionally, subcarrier spacings in the numerologies of the other subbands occupy 2 bits.

Optionally, cyclic prefix lengths in the numerologies of the other subbands occupy 1 bit.

Optionally, the configuration information of the other subbands further includes: an offset of a center frequency point of a time-frequency resource block with respect to a center frequency point of each of the other subbands.

Optionally, the transmitting circuitry is configured to transmit the one or more time-frequency resource blocks to the user equipment with a fixed time period.

A user equipment is also provided according to embodiments of the present disclosure. The user equipment includes: a receiving circuitry, configured to receive one or more time-frequency resource blocks transmitted by a base station, where the one or more time-frequency resource blocks are located within an initial access subband and uses a second numerology, and the second numerology is a fixed numerology; the initial access subband is a subband corresponding to a numerology in a first numerology group used by a target carrier, where the first numerology group includes any one or more numerologies that are allowed to be used by the target carrier; and a time-frequency resource block includes a synchronization signal and a broadcast channel, where the broadcast channel carries at least configuration information of the initial access subband; a synchronizing circuitry, configured to detect the one or more time-frequency resource blocks, obtain the synchronization signal and perform a time-frequency synchronization; a decoding circuitry, configured to determine a location of the broadcast channel in the one or more time-frequency resource blocks and decode the broadcast channel after a synchronization with the initial access subband; and a detecting circuitry, configured to detect a corresponding downlink control channel based on decoded information.

Optionally, the user equipment further includes: an obtaining circuitry, configured to obtain configuration information of other subbands of the target carrier from the one or more time-frequency resource blocks; and an accessing circuitry, configured to access the other subbands according to the configuration information of the other subbands so as to transmit and receive data on the other subbands.

With the method in the present disclosure, the synchronization signal and the broadcast channel to be transmitted are mapped to the preset one or more time-frequency resource blocks of the target carrier, where the broadcast channel carries at least the configuration information of the initial access subband. Therefore, when receiving the one or more time-frequency resource blocks, the user equipment can obtain the configuration information of the initial access subband from the one or more time-frequency resource blocks and access the broadcast channel of the initial access subband, so as to detect the downlink control channel. Since the second numerology used by the time-frequency resource block is a fixed numerology, complexity of blind detection by the user equipment can be reduced.

Further, slot duration of the time-frequency resource block is set as $½^m$ or $2^m$ milliseconds, where m is a positive integer, which can facilitate timing and counting of the time-frequency resource block.

Further, the bandwidth of the initial access subband is set to be equal to the bandwidth of the reference signal used by the user equipment for performing the radio resource management measurement on the initial access subband, so that the bandwidth of the reference signal used by the user equipment for performing the radio resource management measurement on the initial access subband can be obtained, when the user equipment obtains the bandwidth of the initial access subband. Therefore, signaling overhead can be reduced.

Further, the bandwidth of the initial access subband is set to be the same as the bandwidth of the downlink control channel in the initial access subband, so that the bandwidth of the downlink control channel in the initial access subband can be obtained when the user equipment obtains the bandwidth of the initial access subband, which can reduce the signaling overhead.

Further, since the time-frequency resource block also includes the configuration information of the other subbands, so that the user equipment can obtain the configuration information of the other subbands from the time-frequency resource block when the user equipment receives the one or more time-frequency resource blocks, and further access the other subbands for data transmission and reception.

Further, the one or more time-frequency resource blocks are transmitted to the user equipment with a fixed time period, which may facilitate the user equipment determining a system timing.

DETAILED DESCRIPTION

In order to reduce complexity of blind detection, one approach is to preset a numerology of a synchronization signal including a subcarrier spacing and a cyclic prefix length etc. When information is to be transmitted to a user equipment, the synchronization signal may be mapped onto a carrier of a fixed numerology and then transmitted to the user equipment through the carrier of the fixed numerology.

However, no feasible solution is available yet on how to transmit the synchronization signal and the broadcast channel to the user equipment using a carrier of a non-fixed numerology.

A method for transmitting information in a communication system is provided according to embodiments of the present disclosure to solve the aforementioned problems. In the method, a synchronization signal and a broadcast channel to be transmitted are mapped to preset one or more time-frequency resource blocks of a target carrier, where the broadcast channel carries at least configuration information of an initial access subband. When receiving the one or more time-frequency resource blocks, the user equipment can obtain the configuration information of the initial access subband from the one or more time-frequency resource blocks and access the initial access subband, so as to detect the downlink control channel. Since the second numerology used by a time-frequency resource block is a fixed numerology, complexity of blind detection by the user equipment can be reduced.

The foregoing objects, features and advantages of the present disclosure will become more apparent from the following detailed description taken in conjunction with the accompanying drawings.

Figure 1:
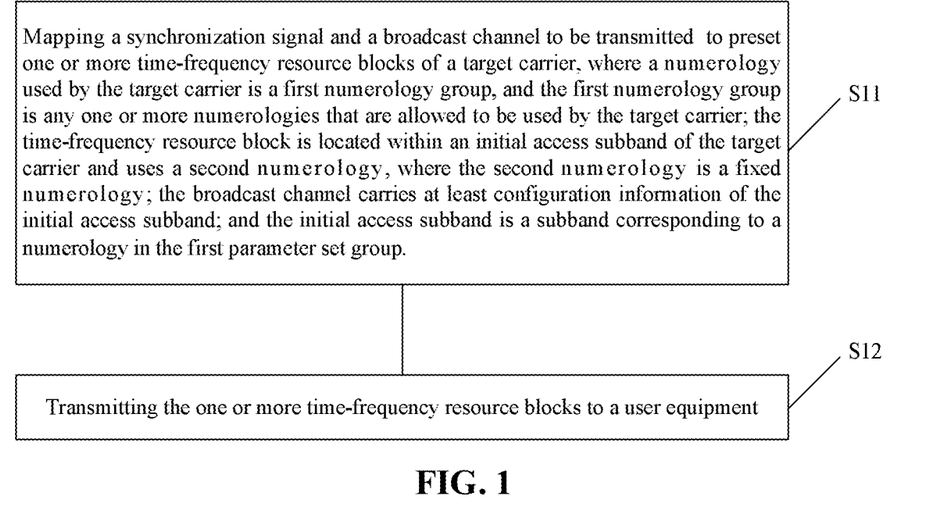
FIG. 1 schematically illustrates a flow chart of a method for transmitting information in a communication system according to an embodiment of the present disclosure.

With reference to FIG. 1, FIG. 1 schematically illustrates a method for transmitting information in a communication system according to an embodiment of the present disclosure. The method may include steps S11 and S12.

In S11, a synchronization signal and a broadcast channel to be transmitted are mapped to preset one or more time-frequency resource blocks of a target carrier, where a numerology used by the target carrier is a first numerology group, and the first numerology group includes any one or more numerologies that are allowed to be used by the target carrier; the one or more time-frequency resource blocks are located within an initial access subband of the target carrier and uses a second numerology, where the second numerology is a fixed numerology; the broadcast channel carries at least configuration information of the initial access subband; and the initial access subband is a subband corresponding to a numerology in the first numerology group.

In some embodiments, the base station may set only one time-frequency resource block or a plurality of time-frequency resource blocks in the target carrier, and a number of the time-frequency resource blocks and resources occupied by the time-frequency resource blocks may be determined in accordance with a transmission mode of the synchronization signal and the broadcast channel to be transmitted. The base station may map the synchronization signal and the broadcast channel to be transmitted to different time-frequency resource blocks of the target carrier, or to a same time-frequency resource block of the target carrier.

Where the numerology used by the target carrier is the first numerology group which includes any one or more of numerologies allowed to be used in a 5GNR system. In other word, the target carrier may use only one numerology or a plurality of numerologies at the same time, and any one of the numerologies used by the target carrier is a non-fixed numerology, namely, a subcarrier spacing and a cyclic prefix length in the any one of the numerologies can be arbitrarily set, as long as the 5GNR system allows.

In some embodiments, the target carrier may include a plurality of subbands, each subband may correspond to a different numerology, or two or more subbands correspond to a same numerology, and the present disclosure imposes no restriction on this. For example, a subband 1 may have a bandwidth of 110 physical resource blocks, with a subcarrier spacing of 15 kHz; and a subband 2 may have a bandwidth of 55 physical resource blocks, with a subcarrier spacing of 30 kHz.

In some embodiments, the time-frequency resource block may be located within any subband of the target carrier. In an embodiment of the present disclosure, a subband where the time-frequency resource block is located, is referred to as an initial access subband. In other embodiments, a subband where the time-frequency resource block is located may be referred to as a camping-on subband, a default subband or a reference subband etc. Then the numerology used by the initial access subband may be the first numerology group, i.e. the initial access subband may use any one or more numerologies that are allowed in the 5GNR system.

In some embodiments, the time-frequency resource block may include n physical resource blocks in a frequency domain, and k symbols in a time domain, where n and k are positive integers, such as k=14 or k=7. A bandwidth of the time-frequency resource block can be determined by the number of the physical resource blocks, for example, when n=6, the bandwidth of the time-frequency resource block is 6 resource blocks. The bandwidth of the time-frequency resource block is predefined and may be smaller than a bandwidth of an initial access subband, or equal to the bandwidth of the initial access subband.

In some embodiments, the time-frequency resource block may use a second numerology, and the second numerology is a fixed numerology. The fixed numerology means that, the second numerology of the time-frequency resource block is the same irrespective of a bandwidth, a subcarrier spacing, or a cyclic prefix length of the target carrier. Where the second numerology may include a fixed subcarrier spacing and a fixed cyclic prefix length. For example, a subcarrier spacing of the time-frequency resource block, i.e., the fixed subcarrier spacing may be 15 kHz, and a cyclic prefix length of the time-frequency resource block, i.e., the fixed cyclic prefix length may be any one of a Normal Cyclic Prefix (NCP) length and an Extended Cyclic Prefix (ECP) length.

In practice, for facilitating implementation, the subcarrier spacing of the time-frequency resource block may be set as 15 KHz for a carrier having a bandwidth of 6 GHz or less, and the subcarrier spacing of the time-frequency resource block may be set as 60 kHz for a carrier having a bandwidth of 6 GHz or more.

In the 5GNR system, for different subbands in a target carrier, a slot duration may be determined by y symbols of a corresponding subband. A slot may also be referred to as a time interval X. When one carrier is corresponding to multiple numerologies, symbol lengths of subbands corresponding to different numerologies are different, therefore the slot durations of the subbands corresponding to the different numerologies are also different. For example, a numerology 1 has a subcarrier spacing of 15 kHz and an NCP length, and a subband corresponding to the numerology 1 has a slot duration of 7 symbols, i.e., 0.5 milliseconds. A numerology 2 has a subcarrier spacing of 30 kHz and an NCP length, and a subband corresponding to the numerology 2 has a slot duration of 7 symbols, i.e. approximately 0.25 milliseconds.

In some embodiments, a slot duration of the time-frequency resource block may be predetermined or may be indicated in a certain manner, such as a slot duration of a broadcast channel may be indicated through a synchronization signal. In an embodiment, the synchronization signal is in a same slot as the broadcast channel, and the user equipment can determine whether the broadcast channel is in the slot by blind detecting the synchronization signal. Usually, the slot duration of the time-frequency resource block is an integral multiple of a slot duration of the initial access subband, and the slot duration of the time-frequency resource block is a slot duration of the n physical resource blocks, therefore the time-frequency resource block occupies at least one slot of the initial access subband. For example, a numerology 1 has a subcarrier spacing of 15 kHz and a numerology 2 has a subcarrier spacing of 30 kHz. When the time-frequency resource block has a slot duration of 1 millisecond, the slot duration of the time-frequency resource block is two slots of the numerology 1 or four slots of the numerology 2. When the time-frequency resource block has a slot duration of 0.5 milliseconds, the slot duration of the time-frequency resource block is one slot of the numerology 1 or two slots of the numerology 2.

In some embodiments, in order to facilitate timing and counting of the time-frequency resource block, the time-frequency resource block may be set to have a slot duration of ½^m or 2^m ms, where m is a positive integer. For example, when the time-frequency resource block has a subcarrier spacing of 15 KHz, the time-frequency resource block may have a slot duration of ½ ms (corresponding to 7 symbols), 1 ms (corresponding to 14 symbols) or 2 ms (corresponding to 28 symbols). When the time-frequency resource block has a subcarrier spacing of 60 kHz, the time-frequency resource block may have a slot duration of ⅛ ms (corresponding to 7 symbols), ¼ ms (corresponding to 14 symbols) or ½ ms (corresponding to 28 symbols).

In some embodiments, the synchronization signal and the broadcast channel in the time-frequency resource block may be independently decoded within x milliseconds, when the time-frequency resource block has a subcarrier spacing of 15 KHz. In order to increase a cell coverage, the base station may repeatedly transmit the time-frequency resource block within next one or more x milliseconds, or transmit the time-frequency resource block using other beams, where x may be ½ millisecond or 1 millisecond. In one embodiment, when the time-frequency resource block has a subcarrier spacing of 60 KHz, the synchronization signal and the broadcast channel in the time-frequency resource block can be independently decoded within y milliseconds. In order to increase the cell coverage, the base station may repeatedly transmit the time-frequency resource block within next one or more y milliseconds, or transmit the time-frequency resource block using other beams, where y may be ⅛ ms or ¼ ms.

In some embodiments, when the base station allocates resources for the time-frequency resource block, resource of the downlink control channel is frequently overlapped with resource of the time-frequency resource block. When the resource of the downlink control channel (also referred to as physical downlink control channel) is overlapped with the resource of the time-frequency resource block, the base station can perform a corresponding rate matching on the downlink control channel, that is, the base station may not use the overlapped resource as an available resource of the downlink control channel, so that a slot duration of the time-frequency resource block cannot be affected by a time-frequency resource of the downlink control channel. In some embodiments, a broadcast channel carries configuration information of an initial access subband, and a user equipment can access the broadcast channel of the initial access subband according to the configuration information of the initial access subband, and further obtain a bandwidth and configuration information in a time domain of the downlink control channel in the initial access subband, so that the user equipment can detect the downlink control channel in the initial access subband and receive a control message, where the control message may be a common control message as well as a paging message and so on.

In some embodiments, the configuration information of the initial access subband may include a bandwidth and a numerology of the initial access subband. Based on the bandwidth and the numerology of the initial access subband, the user equipment may obtain the bandwidth and the configuration information in the time domain of the downlink control channel in the initial access subband.

In some embodiments, in order to reduce signaling overhead, the bandwidth of the initial access subband may be the same as a bandwidth of a reference signal used by a user equipment for performing a Radio Resource Management (RRM) measurements on the initial access subband. Where, the RRM measurement may also be referred to as a mobility management measurement, the user equipment needs to report the measurement results to a base station, and the base station performs the mobility management. When the user equipment obtains the bandwidth of the initial access subband by decoding, the bandwidth of the reference signal used by the user equipment for performing the RRM measurement on the initial access subband can be also obtained. After obtaining the bandwidth of the reference signal used for performing the RRM measurement on the initial access subband, the user equipment may perform the RRM measurement in an idle state or other state (e.g., an inactive state) using the reference signal in the time-frequency resource block, and perform a time and frequency synchronization with the base station using the reference signal within the time-frequency resource block.

In some embodiments, the bandwidth of the initial access subband may be the same as a bandwidth of a downlink control channel in the initial access subband in order to reduce signaling overhead. When a user equipment obtains the bandwidth of the initial access subband by decoding, the bandwidth of the downlink control channel within the initial access subband can be also obtained. When receiving a reference signal transmitted by the base station for decoding a downlink control channel in the initial access subband, the user equipment can decode the downlink control channel in the initial access subband, according to the bandwidth of the downlink control channel in the initial access subband.

In some embodiments, a reference signal for decoding the downlink control channel in the initial access subband and a reference signal for decoding the broadcast channel in the initial access subband are of a quasi-co-location. That is, the reference signal for decoding the downlink control channel in the initial access subband and the reference signal for decoding the broadcast channel in the initial access subband are transmitted to the user equipment using a same physical antenna, so that the reference signals for decoding the downlink control channel and the broadcast channel in the initial access subband can share a same large-scale properties, for example, a time-frequency synchronization etc., which can reduce resource overhead of the reference signals.

The time-domain configuration of the downlink control channel within the initial access subband may be default. In some embodiments, the slot of the initial access subband within the slot duration of the time-frequency resource block may default as a downlink slot of the downlink control channel that is included in the initial access subband, and a first symbol of each downlink slot in the initial access subband may be used as a time duration of the downlink control channel in the time domain. Then the user equipment can detect the downlink control channel in the initial access subband and receive a control message, according to a bandwidth of the initial access subband and the time-domain configuration information of the downlink control channel.

For example, a numerology 1 has a subcarrier spacing of 15 kHz and a numerology 2 has a subcarrier spacing of 30 kHz. When the time-frequency resource block has a slot duration of 1 millisecond, two slots corresponding to the numerology 1 and four slots corresponding to the numerology 2 are the default downlink slots. When the slot of the time-frequency resource block has a slot duration of 0.5 milliseconds, one slot corresponding to the numerology 1 and two slots corresponding to the numerology 2 are the default downlink slots. The default downlink slots can reduce signaling that the base station indicates to the user equipment.

In some embodiments, the numerology of the initial access subband may include only a subcarrier spacing of the initial access subband, or may include only a cyclic prefix length of the initial access subband, or may include both the subcarrier spacing and the cyclic prefix length of the initial access subband.

In some embodiments, the subcarrier spacing of the initial access subband may be indicated by two bits, i.e. the subcarrier spacing of the initial access subband may occupy 2 bits. For example, for a carrier with a bandwidth of 6 GHz or less, two bits may be used to indicate a subcarrier spacing of 7.5 kHz, 15 kHz, 30 kHz, or 60 kHz, and for a carrier with a bandwidth of 6 GHz or more, two bits may be used to indicate a subcarrier spacing of 60 kHz, 120 kHz, 240 kHz or 480 kHz.

In some embodiments, the cyclic prefix length may be indicated using 1 bit, i.e., the cyclic prefix length of the initial access subband may occupy 1 bit. For example, when the cyclic prefix length includes both an NCP length and an ECP length, one bit may be used to indicate which cyclic prefix length is applied. In some embodiments, the initial access subband may use a same cyclic prefix length as the time-frequency resource block, and when the user equipment obtains the cyclic prefix length of the time-frequency resource block by blind detection, the cyclic prefix length of the initial access subband can be also determined without an indication using a corresponding bit.

In some embodiments, since a numerology of the target carrier is a non-fixed numerology, flexibility of the numerology of the target carrier may lead that there is an offset between a center frequency point of the time-frequency resource block and a center frequency point of the initial access subband. The user equipment needs to obtain the offset when detecting the downlink control channel. Therefore, the configuration information of the initial access subband may further include the offset of the center frequency point of the time-frequency resource blocks with respect to the center frequency point of the initial access subband. If the offset between the center frequency point of the time-frequency resource block and the center frequency point of the initial access subband is zero, then the configuration information of the initial access subband may not include the offset of the center frequency point of the time-frequency resource block with respect to the center frequency point of the initial access subband.

In some embodiments, the target carrier may include one or more other subbands in addition to the initial access subband. In some condition, the other subbands only need to be used when the user equipment is in a connection state. Therefore, the user equipment may obtain configuration information of the other subbands when being in the connection state, but not obtain the configuration information of the other subbands when being in an idle state.

In some embodiments, the one or more time-frequency resource blocks transmitted to the user equipment may further include a common control channel (also referred to as an extended broadcast channel), where the common control channel may be mapped to one of the time-frequency resource blocks or a plurality of time-frequency resource blocks. The common control channel may carry configuration information of one or more other subbands. That is, the time-frequency resource block may include, in addition to the configuration information of the initial access subband, the configuration information of the one or more other subbands (referred to as other subbands hereinafter) in the target carrier other than the initial access subband. When receiving the time-frequency resource block, the user equipment can determine a location of the common control channel in the time-frequency resource block according to a pre-appointed location information, decode the common control channel, obtain the configuration information of the one or more other subbands and access a corresponding subband for data transceiver.

In some embodiments, the time-frequency resource block may not include the configuration information of the one or more other subbands, but include scheduling information for scheduling a user equipment to receive the configuration information of the one or more subbands on a physical shared channel (or referred to as a physical data channel). The scheduling information may be carried in a variety of ways, such as be carried by a downlink control channel of the initial access subband. After obtaining the scheduling information, the user equipment may receive the configuration information of the one or more other subbands on a corresponding physical shared channel.

In some embodiments, the configuration information of the other subbands may include bandwidths and numerologies of the other subbands. According to the bandwidths and the numerologies of the other subbands, the user equipment may access the other subbands for data transmission and reception.

In some embodiments, bandwidths of the other subbands may be the same as a bandwidth of a reference signal used by the user equipment to perform RRM measurements on the other subbands. The bandwidth of the reference signal used by the user equipment to perform the RRM measurements on the other subbands can be obtained when the user equipment obtains the bandwidth of the other subbands, so as to perform the RRM measurements on the other subbands. For example, taking the other subbands including a subband 1 and a subband 2 as an example, a bandwidth of a reference signal used for performing an RRM measurement on the subband 1 can be obtained when a bandwidth of the subband 1 is obtained, so as to perform the RRM measurement on the subband 1. And a bandwidth of a reference signal used for performing an RRM measurement on the subband 2 can be obtained when a bandwidth of the subband 2 is obtained, so as to perform the RRM measurement on the subband 2.

In some embodiments, bandwidths of the other subbands are the same as bandwidths of downlink control channels in the other subbands. When the user equipment obtains the bandwidths of the other subbands by decoding, the bandwidths of the downlink control channels in the other subbands can be also obtained. Where time-domain configuration of the downlink control channels in the other subbands may be default. In some embodiments, slots of the other subbands within a slot duration of the time-frequency resource block may default as downlink slots of downlink control channels to be detected by the user equipment, where the downlink control channels are included in the other subbands, and a first symbol of a downlink slot of each of the other subbands can be used as a time duration of a downlink control channel in a time domain. Then, the user equipment may detect the downlink control channels in the other subbands and receive a control message, according to bandwidths of the other subbands and time-domain configuration information of the downlink control channels.

In some embodiments, numerologies of the other subbands may only include subcarrier spacings of the other subbands, or may include only cyclic prefix lengths of the other subbands, or may include both the subcarrier spacings and the cyclic prefix lengths of the other subbands.

In some embodiments, a subcarrier spacing of each of the other subbands may be indicated using 2 bits, i.e. the subcarrier spacing of each of the other subbands may occupy 2 bits. For example, for a carrier with a bandwidth of 6 GHz or less, two bits may be used to indicate a subcarrier spacing of 7.5 kHz, 15 kHz, 30 kHz, or 60 kHz; and for a carrier with a bandwidth of 6 GHz or more, two bits may be used to indicate a subcarrier spacing of 60 kHz, 120 kHz, 240 kHz or 480 kHz.

In some embodiments, a cyclic prefix length for each of the other subbands may be indicated using 1 bit, i.e. the cyclic prefix length of each of the other subbands may occupy 1 bit. For example, when the cyclic prefix length includes an NCP length and an ECP length, one bit may be used to indicate which cyclic prefix length is applied. In some embodiments, the other subbands may use a same cyclic prefix length as the time-frequency resource block, when the user equipment obtains the cyclic prefix length of the time-frequency resource block by blind detection, the cyclic prefix lengths of the other subbands can be determined without an indication using a corresponding bit.

In some embodiments, since a numerology of a target carrier is a non-fixed numerology, flexibility of the numerology of the target carrier may lead that there is an offset between a center frequency point of the time-frequency resource block and a center frequency point of the other subbands. The user equipment needs to obtain the offset when accessing the other subbands. Therefore, the configuration information of the other subbands may further include the offset of the center frequency point of the time-frequency resource block with respect to the center frequency point of the other subbands. If the offset between the center frequency point of the time-frequency resource block and the center frequency point of the other subbands is 0, the configuration information of the other subbands may not include the offset of the center frequency point of the time-frequency resource block with respect to the center frequency point of the other subbands.

In another embodiment, the configuration information of the other subbands may include slot configuration information of all other subbands except for the initial access subband, i.e. slot configuration information of the other subbands.

In some embodiments, the slot configuration information of all the other subbands may include at least indication information of slots with downlink control channels in all slots in a time period. According to the indication information, the user equipment can determine the slots with the downlink control channels in the time period, and further can detect the downlink control channels. Where, a slot type of each downlink control channel may be pre-appointed. For example, the slot type of the each downlink control channel may be a certain downlink slot type or a hybrid uplink and downlink slot type. It will be appreciated that, the present disclosure imposes no limitation on the specific slot type of the each downlink control channel.

In S12, the one or more time-frequency resource blocks are transmitted to the user equipment.

In some embodiments, the one or more time-frequency resource blocks may be transmitted to the user equipment in a number of ways. In an embodiment of the present disclosure, the time-frequency resource blocks may be transmitted to the user equipment in a fixed time period in order to facilitate the user equipment determining a system timing.

Where a length of the time period may be determined by one of ordinary skill in the art depending on an actual condition, and the present disclosure imposes no limitation on this. When receiving the one or more time-frequency resource blocks, the user equipment can access a broadcast channel of the initial access subband according to the configuration information of the initial access subband, and then detect the downlink control channel.

Figure 2:
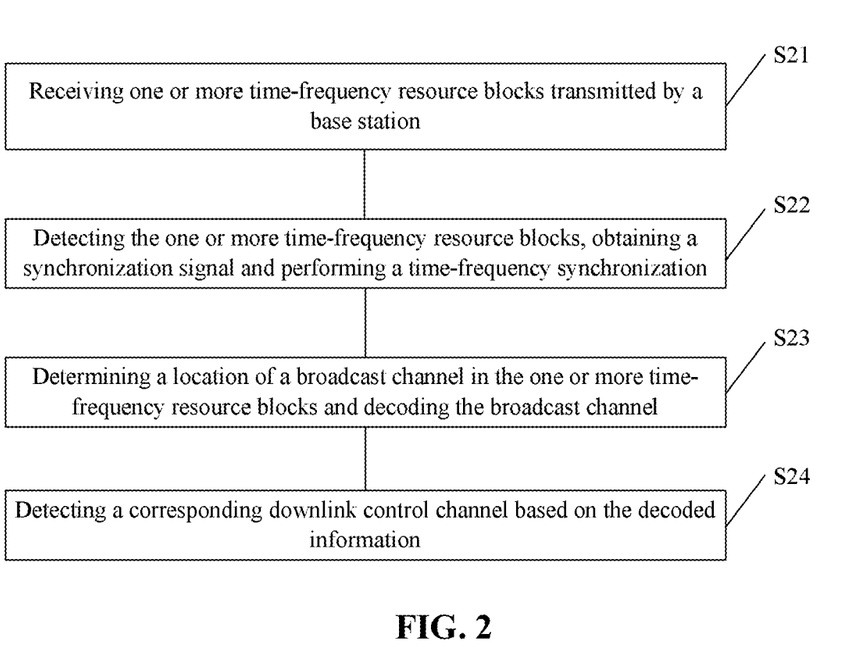
FIG. 2 schematically illustrates a flow chart of a method for transmitting information in a communication system according to another embodiment of the present disclosure.

FIG. 2 schematically illustrates a flow chart of a method for transmitting information in a communication system according to another embodiment in the present disclosure. Referring to FIG. 2, the method may include steps S21, S22, S23 and S24.

In S21, one or more time-frequency resource blocks transmitted by a base station is received.

Where the one or more time-frequency resource blocks are located within an initial access subband and uses a second numerology, and the second numerology is a fixed numerology. The initial access subband is a subband corresponding to a numerology in a first numerology group used by a target carrier, and the first numerology group includes any one or more numerologies that are allowed to be used by the target carrier. The time-frequency resource block includes a synchronization signal and a broadcast channel, and the broadcast channel carries at least configuration information of the initial access subband.

In some embodiments, the second numerology may include a fixed subcarrier spacing and a fixed cyclic prefix length, where the fixed cyclic prefix length is any one of an NCP length and an ECP length.

In some embodiments, the time-frequency resource block has a slot duration of $\frac{1}{2}^m$ or $2^m$ milliseconds, where m is a positive integer.

In some embodiments, the time-frequency resource block occupies one or more slots of the initial access subband.

In some embodiments, the configuration information of the initial access subband may include a bandwidth and a numerology of the initial access subband.

In some embodiments, in order to reduce signaling overhead, the bandwidth of the initial access subband is the same as a bandwidth of a reference signal used by the user equipment to perform an RRM measurement on the initial access subband.

In some embodiments, in order to reduce signaling overhead, the bandwidth of the initial access subband is the same as a bandwidth of a downlink control channel within the initial access subband.

In some embodiments, a subcarrier spacing in the numerology of the initial access subband occupies 2 bits, and a cyclic prefix length in the numerology of the initial access subband occupies 1 bit.

In some embodiments, the configuration information of the initial access subband may further include an offset of a center frequency point of the time-frequency resource block with respect to a center frequency point of the initial access subband.

The time-frequency resource block, the initial access subband and the target carrier can be referred to the corresponding description in S11, which will not be described in detail herein.

In S22, the one or more time-frequency resource blocks are detected to obtain the synchronization signal and perform a time-frequency synchronization.

In some embodiments, after detecting the one or more time-frequency resource blocks and obtaining a synchronization signal, the user equipment performs the time-frequency synchronization according to the synchronization signal, and finally is synchronized with the initial access subband.

In S23, a location of the broadcast channel in the one or more time-frequency resource blocks is determined and the broadcast channel is decoded.

In some embodiments, the location of the broadcast channel in the one or more time-frequency resource blocks may be preset, so that the location of the broadcast channel can be determined according to the preset location information after the synchronization with the initial access subband, and the broadcast channel can be further decoded to obtain the configuration information of the initial access subband.

In S24, a corresponding downlink control channel is detected based on the decoded information.

Where the decoded information includes the configuration information of the initial access subband, that is, a subcarrier spacing and a cyclic prefix length of the initial access subband. The downlink control channel that needs to be detected can be determined according to the configuration information of the initial access subband, so as to perform detection on the downlink control channel.

In some embodiments, it is also possible to obtain configuration information of other subbands in the target carrier based on the received one or more time-frequency resource blocks. According to the configuration information of the other subbands, the user equipment can access the other subbands and transmit and receive data.

Figure 3:
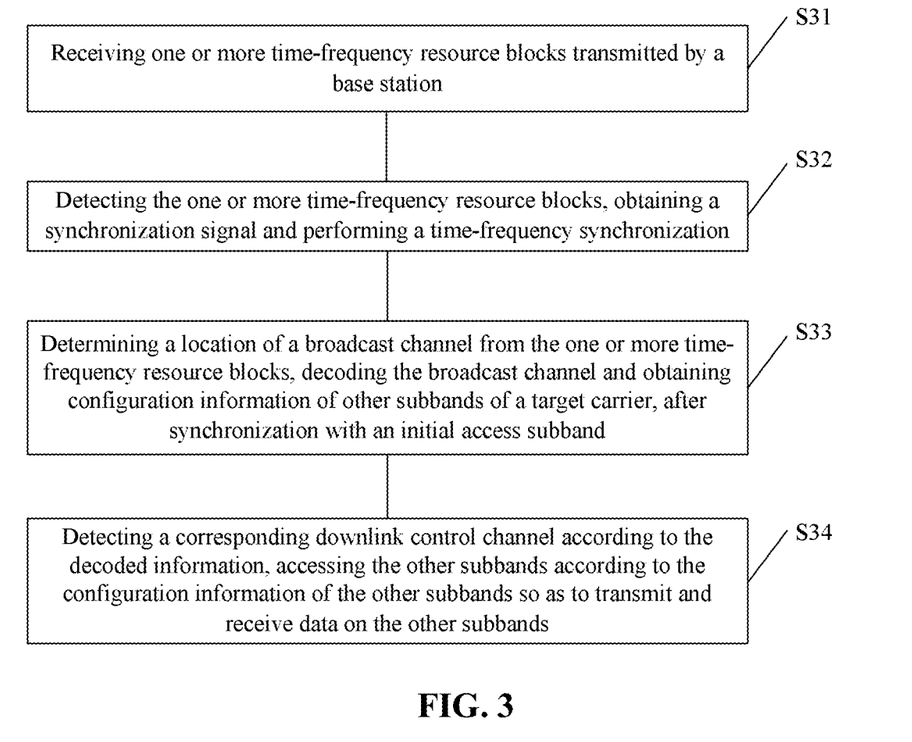
FIG. 3 schematically illustrates a flow chart of a method for transmitting information in a communication system according to another embodiment of the present disclosure.

Specifically, referring to FIG. 3, the method may include steps S31, S32, S33 and S34.

In S31, one or more time-frequency resource blocks transmitted by a base station are received.

In S32, the one or more time-frequency resource blocks are detected to obtain a synchronization signal and perform a time-frequency synchronization.

The steps S31 and S32 can be referred to the description on S21 and S22, which will not be described in detail herein.

In S33, the method further includes determining a location of a broadcast channel from the one or more time-frequency resource blocks, decoding the broadcast channel and obtaining configuration information of other subbands of a target carrier, after a synchronization with an initial access subband.

The method for determining the location of the broadcast channel from the one or more time-frequency resource blocks and decoding the broadcast channel can be referred to the corresponding description on S23, which will not be described in detail herein.

In some embodiments, the configuration information of the other subbands is obtained based on contents of the time-frequency resource blocks. For example, when the time-frequency resource block carries the configuration information of the other subbands through a common control channel, the configuration information of the other subbands can be obtained by decoding the common control channel. When the time-frequency resource block includes scheduling information for scheduling a user equipment to receive the configuration information of the other subbands on a physical shared channel, the configuration information of the other subbands can be recieved on the physical shared channel according to the scheduling information.

In some embodiments, the configuration information of the other subbands may include bandwidths and numerologies of the other subbands.

In some embodiments, in order to reduce signaling overhead, the bandwidths of the other subbands are the same as a bandwidth of a reference signal used by the user equipment to perform RRM measurements on the other subbands.

In some embodiments, in order to reduce the signaling overhead, the bandwidths of the other subbands are the same as bandwidths of downlink control channels in the other subbands.

In some embodiments, a subcarrier spacing in a numerology of any of the other subbands occupies 2 bits, and a cyclic prefix length in the numerology of any of the other subbands occupies 1 bit.

In some embodiments, the configuration information of the other subbands may further include an offset of a center frequency point of the time-frequency resource block with respect to a center frequency point of each of the other subbands.

The configuration information of the other subbands may be referred to the description on S11, which will not be described in detail herein.

In S34, the method includes detecting a corresponding downlink control channel according to the decoded information, accessing the other subbands according to the configuration information of the other subbands so as to transmit and receive data on the other subbands.

Where the method for detecting the corresponding downlink control channel based on the decoded information may be referred to the description on S24, which will not be discussed in detail herein.

In some embodiments, the user equipment may access a corresponding subband and perform data transmission and reception according to the configuration information of the other subbands. Where the other subbands may include one or more subbands in the target carrier other than the initial access subband. For example, when the other subbands include a subband 1 and a subband 2, the subband 1 may be accessed according to configuration information of the subband 1, and then data may be transmitted and received on the subband 1. The subband 2 may be accessed according to configuration information of the subband 2, and then data may be transmitted and received on the subband 2.

It is clear from the above that, the method for transmitting information in the communication system according to embodiments of the present disclosure is achieved by mapping the synchronization signal and the broadcast channel to be transmitted to the preset one or more time-frequency resource blocks of the target carrier, where the broadcast channel carries at least the configuration information of the initial access subband. Therefore, when receiving the one or more time-frequency resource blocks, the user equipment can access the broadcast channel of the initial access subband according to the configuration information of the initial access subband, so as to detect the downlink control channel. Since the time-frequency resource block uses a fixed numerology, complexity of blind detection by the user equipment can be reduced.

In order for those skilled in the art better understanding and implementing the present disclosure, apparatuses corresponding to the aforementioned methods for transmitting information in a communication system will be described in detail below.

Figure 4:
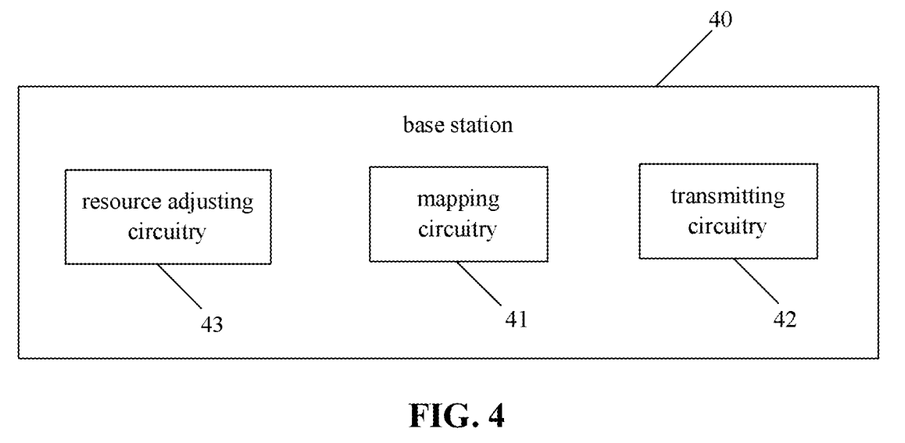
FIG. 4 schematically illustrates a structural diagram of a base station according to an embodiment of the present disclosure.

Referring to FIG. 4, a base station 40 is provided according to an embodiment of the present disclosure, where the base station 40 may include a mapping circuitry 41 and a transmitting circuitry 42.

The mapping circuitry 41 is configured to map a synchronization signal and a broadcast channel to be transmitted to preset one or more time-frequency resource blocks in a target carrier, where a numerology used by the target carrier is a first numerology group, the first numerology group includes any one or more numerologies that are allowed to be used by the target carrier; each of the one or more time-frequency resource blocks is located within an initial access subband of the target carrier and uses a second numerology, where the second numerology is a fixed numerology; the broadcast channel carries at least configuration information of the initial access subband; and the initial access subband is a subband corresponding to a numerology in the first numerology group.

The transmitting circuitry 42 is configured to transmit the one or more time-frequency resource blocks to a user equipment.

In some embodiments, the second numerology may include a fixed subcarrier spacing and a fixed cyclic prefix length.

In some embodiments, the fixed cyclic prefix length is any one of an NCP length and an ECP length.

In some embodiments, the time-frequency resource block has a slot duration of $\frac{1}{2}^{\wedge}$ m or $2^{\wedge}$m milliseconds, and m is a positive integer.

In some embodiments, the time-frequency resource block occupies one or more slots of the initial access subband.

In some embodiments, the base station 40 may further include a resource adjusting circuitry.

The resource adjusting circuitry 43 is configured to adjust resource occupied by a downlink control channel by rate matching, when the resource of the downlink control channel is overlapped with resource of the time-frequency resource block.

In some embodiments, the configuration information of the initial access subband may include a bandwidth and a numerology of the initial access subband.

In some embodiments, the bandwidth of the initial access subband is the same as a bandwidth of a reference signal used by the user equipment for performing an RRM measurement on the initial access subband.

In some embodiments, the bandwidth of the initial access subband is the same as a bandwidth of a downlink control channel in the initial access subband.

In some embodiments, a reference signal for decoding the downlink control channel in the initial access subband and a reference signal for decoding a broadcast channel in the initial access subband are of a quasi-co-location.

In some embodiments, a subcarrier spacing in the numerology of the initial access subband occupies 2 bits.

In some embodiments, a cyclic prefix length in the numerology of the initial access subband occupies 1 bit.

In some embodiments, the cyclic prefix length in the numerology of the initial access subband is the same as a cyclic prefix length of the time-frequency resource block.

In some embodiments, the configuration information of the initial access subband further includes an offset of a center frequency point of the time-frequency resource block with respect to a center frequency point of the initial access subband.

In some embodiments, a downlink control channel in the initial access subband carries at least scheduling information for scheduling the user equipment to receive configuration information of other subbands on a physical shared channel, and the other subbands include subbands of the target carrier other than the initial access subband.

In some embodiments, the one or more time-frequency resource blocks further include a common control channel, where the common control channel carries at least configuration information of other subbands, and the other subbands include subbands of the target carrier other than the initial access subband.

In some embodiments, the configuration information of the other subbands includes bandwidths and numerologies of the other subbands.

In some embodiments, the bandwidths of the other subbands are the same as a bandwidth of a reference signal used by the user equipment for performing RRM measurements on the other subbands.

In some embodiments, the bandwidths of the other subbands are the same as bandwidths of downlink control channels in the other subbands.

In some embodiments, subcarrier spacings in the numerologies of the other subbands occupy 2 bits.

In some embodiments, cyclic prefix lengths in the numerologies of the other subbands occupy 1 bit.

In some embodiments, the configuration information of the other subbands may further include an offset of a center frequency point of the time-frequency resource block with respect to a center frequency point of each of the other subbands.

In some embodiments, the transmitting circuitry 42 is configured to transmit the one or more time-frequency resource blocks to the user equipment with a fixed time period.

As described above, the base station according to embodiments of the present disclosure is configured to map the synchronization signal and the broadcast channel to be transmitted to the preset one or more time-frequency resource blocks of the target carrier, where the broadcast channel carries at least the configuration information of the initial access subband. Therefore, when receiving the one or more time-frequency resource blocks, the user equipment can access the broadcast channel of the initial access subband according to the configuration information of the initial access subband, and further can detect the downlink control channel. Since the time-frequency resource block uses a fixed numerology, the complexity of blind detection by the user equipment can be reduced.

Figure 5:
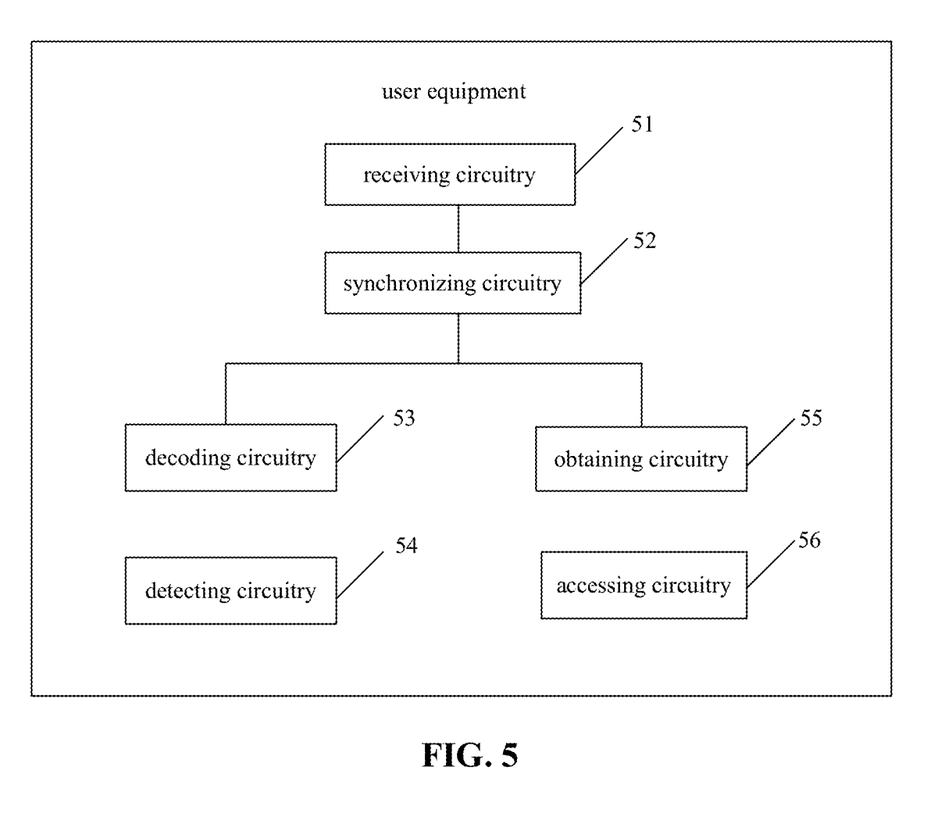
FIG. 5 schematically illustrates a structural diagram of a user equipment according to an embodiment of the present disclosure.

Referring to the FIG. 5, a user equipment 50 is also provided according to embodiments of the present disclosure. The user equipment 50 may include a receiving circuitry 51, a synchronizing circuitry 52, a decoding circuitry 53 and a detecting circuitry 54.

The receiving unit 51 is configured to receive one or more time-frequency resource blocks transmitted by a base station, where each of the one or more time-frequency resource block is located within an initial access subband and uses a second numerology, and the second numerology is a fixed numerology; the initial access subband is a subband corresponding to a numerology in a first numerology group used by a target carrier, where the first numerology group includes any one or more numerologies that are allowed to be used by the target carrier; and the time-frequency resource block includes a synchronization signal and a broadcast channel, where the broadcast channel carries at least configuration information of the initial access subband.

The synchronizing circuitry 52 is configured to detect the one or more time-frequency resource blocks, obtain a synchronization signal and perform a time-frequency synchronization.

The decoding circuitry 53 is configured to determine a location of the broadcast channel in the one or more time-frequency resource blocks and decode the broadcast channel after a synchronization with the initial access subband.

The detecting circuitry 54 is configured to detect a corresponding downlink control channel based on decoded information.

In some embodiments, the user equipment 50 may further include an obtaining circuitry 55 and an accessing circuitry 56.

The obtaining circuitry 55 is configured to obtain configuration information of other subbands of the target carrier from the one or more time-frequency resource blocks.

The accessing circuitry 56 is configured to access the other subbands according to the configuration information of the other subbands so as to transmit and receive data on the other subbands.

In some embodiments, the acquisition unit 55 can obtain the configuration information of the other subbands of the target carrier from the one or more time-frequency resource blocks based on contents of the one or more time-frequency resource blocks. For example, when the time-frequency resource block carries the configuration information of the other subbands through a common control channel, the configuration information of the other subbands can be obtained by decoding the common control channel. When the time-frequency resource block includes scheduling information for scheduling the user equipment to receive the configuration information of the other subbands on a physical shared channel, the configuration information of the other subbands can be received on the physical shared channel according to the scheduling information.

It should be noted that, the subband in the present disclosure refers to a continuous spectrum in a carrier, and may also be referred to as a bandwidth part or a band-part and so on.

It will be appreciated by those of ordinary skill in the art that all or a portion of the steps in the various methods of the embodiments described above may be performed by a program that instructs the associated hardware to be stored in a computer-readable storage medium which may include: ROM, RAM, magnetic disk, or optical disk.

Although the present disclosure has been described above, the present disclosure is not limited thereto. It should be understood by those skilled in the art that various changes and modifications may be made without departing from the spirit and scope of the disclosure, and therefore, the scope of the disclosure should be limited by the scope of the claims.

The invention claimed is:

1. A method for transmitting information in a communication system, comprising:
    mapping a synchronization signal and a broadcast channel to be transmitted to preset one or more time-frequency resource blocks located within an initial access subband of a target carrier, where a numerology used by the target carrier is a first numerology group, and the first numerology group comprises any one or more numerologies that are allowed to be used by the target carrier; the one or more time-frequency resource blocks use a second numerology, where the second numerology is a fixed numerology; the broadcast channel carries at least configuration information of the initial access subband; and the initial access subband is a subband corresponding to a numerology in the first numerology group; and
    transmitting the one or more time-frequency resource blocks to a user equipment,
    wherein the configuration information of the initial access subband comprises a bandwidth and a numerology of the initial access subband, and the bandwidth of the initial access subband is the same as a bandwidth of a downlink control channel in the initial access subband.

2. The method according to claim 1, wherein the second numerology comprises a fixed subcarrier spacing and a fixed cyclic prefix length.

3. The method according to claim 2, wherein the fixed cyclic prefix length is any one of a normal cyclic prefix length and an extended cyclic prefix length.

4. The method according to claim 1, wherein a time-frequency resource block has a slot duration of $½^m$ or $2^m$ milliseconds, and m is a positive integer.

5. The method according to claim 1, wherein a time-frequency resource block occupies one or more slots of the initial access subband.

6. The method according to claim 5, further comprising:
    when resource of a downlink control channel is overlapped with resource of the time-frequency resource block, adjusting the resource of the downlink control channel by rate matching to avoid the resource of the downlink control channel being overlapped with the resource of the time-frequency resource block.

7. The method according to claim 1, wherein the bandwidth of the initial access subband is the same as a bandwidth of a reference signal used by the user equipment for performing a radio resource management measurement on the initial access subband.

8. The method according to claim 1, wherein a reference signal for decoding the downlink control channel in the initial access subband and a reference signal for decoding a broadcast channel in the initial access subband are of a quasi-co-location.

9. The method according to claim 1, wherein a subcarrier spacing in the numerology of the initial access subband occupies 2 bits.

10. The method according to claim 1, wherein a cyclic prefix length in the numerology of the initial access subband occupies 1 bit.

11. The method according to claim 1, wherein the cyclic prefix length in the numerology of the initial access subband is the same as a cyclic prefix length of a time-frequency resource block.

12. The method according to claim 1, wherein the configuration information of the initial access subband further comprises: an offset of a center frequency point of a time-frequency resource block with respect to a center frequency point of the initial access subband.

13. The method according to claim 1, further comprising at least one of:
    a downlink control channel in the initial access subband carrying at least scheduling information for scheduling the user equipment to receive configuration information of other subbands on a physical shared channel, where the other subbands comprise subbands of the target carrier other than the initial access subband; and
    the one or more time-frequency resource blocks comprising a common control channel, where the common control channel carries at least configuration information of other subbands, and the other subbands comprise subbands of the target carrier other than the initial access subband.

14. The method according to claim 13, wherein the configuration information of the other subbands comprises bandwidths and numerologies of the other subbands.

15. The method according to claim 14, wherein the bandwidths of the other subbands are the same as a bandwidth of a reference signal used by the user equipment for performing radio resource management measurements on the other subbands.

16. The method according to claim 14, wherein the bandwidths of the other subbands are the same as bandwidths of downlink control channels in the other subbands.

17. The method according to claim 14, wherein subcarrier spacings in the numerologies of the other subbands occupy 2 bits.

18. The method according to claim 14, wherein cyclic prefix lengths in the numerologies of the other subbands occupy 1 bit.

19. The method according to claim 14, wherein the configuration information of the other subbands further comprises: an offset of a center frequency point of a time-frequency resource block with respect to a center frequency point of each of the other subbands.

20. The method according to claim 1, wherein transmitting the one or more time-frequency resource blocks to the user equipment comprises:
transmitting the one or more time-frequency resource blocks to the user equipment with a fixed time period.

21. A method for transmitting information in a communication system, comprising:
receiving one or more time-frequency resource blocks transmitted by a base station, where the one or more time-frequency resource blocks are located within an initial access subband of a target carrier and uses a second numerology, and the second numerology is a fixed numerology; the initial access subband is a subband corresponding to a numerology in a first numerology group used by the target carrier, where the first numerology group comprises any one or more numerologies that are allowed to be used by the target carrier; and a time-frequency resource block comprises a synchronization signal and a broadcast channel, where the broadcast channel carries at least configuration information of the initial access subband;
detecting the one or more time-frequency resource blocks, obtaining the synchronization signal and performing a time-frequency synchronization;
determining a location of the broadcast channel in the one or more time-frequency resource blocks and decoding the broadcast channel after a synchronization with the initial access subband; and
detecting a corresponding downlink control channel based on decoded information,
wherein the configuration information of the initial access subband comprises a bandwidth and a numerology of the initial access subband, and the bandwidth of the initial access subband is the same as a bandwidth of a downlink control channel in the initial access subband.

22. The method according to claim 21, further comprising: after the synchronization with the initial access subband,
obtaining configuration information of other subbands of the target carrier from the one or more time-frequency resource blocks; and
accessing the other subbands according to the configuration information of the other subbands so as to transmit and receive data on the other subbands.

* * * * *